Patented Nov. 1, 1932

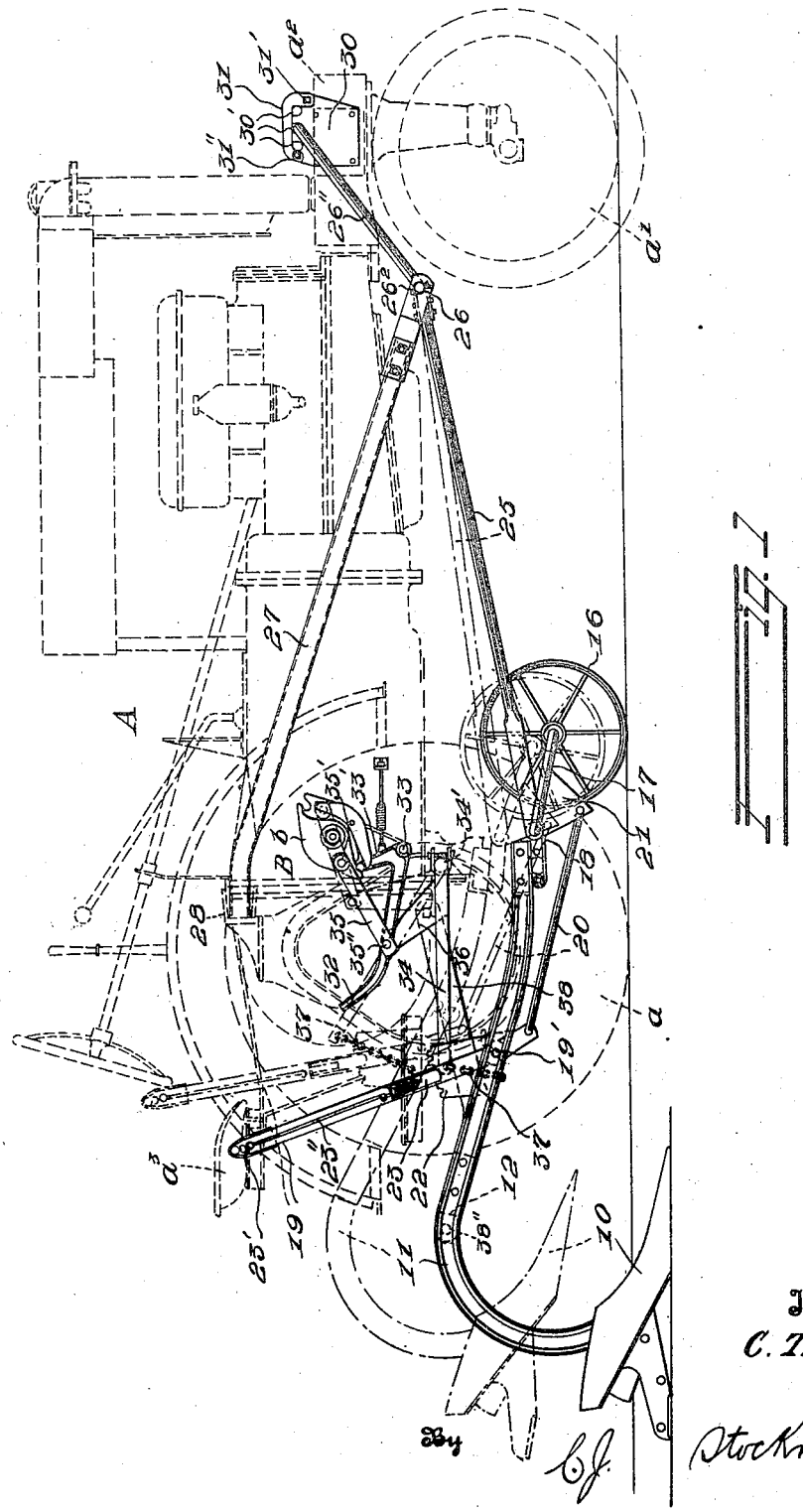

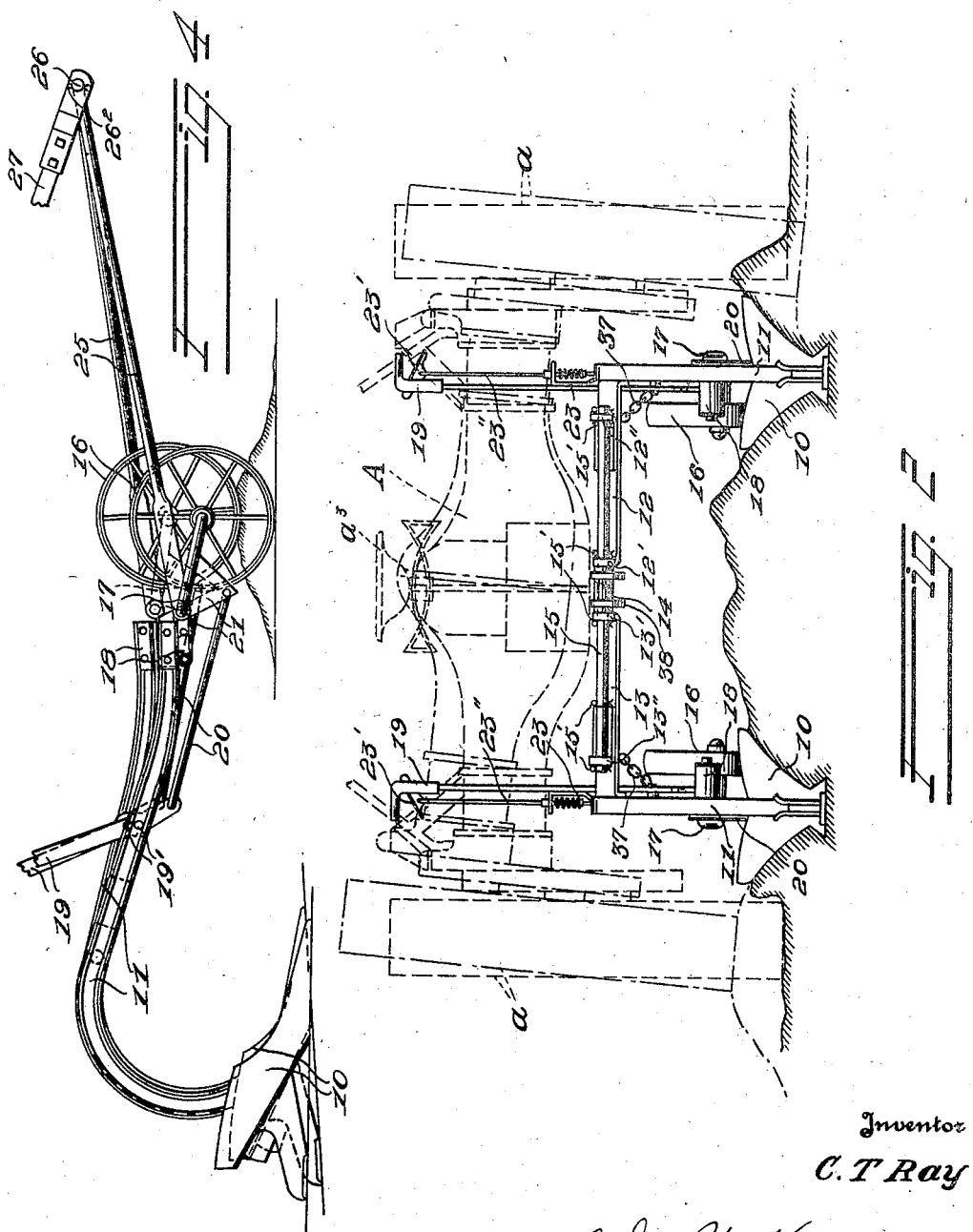

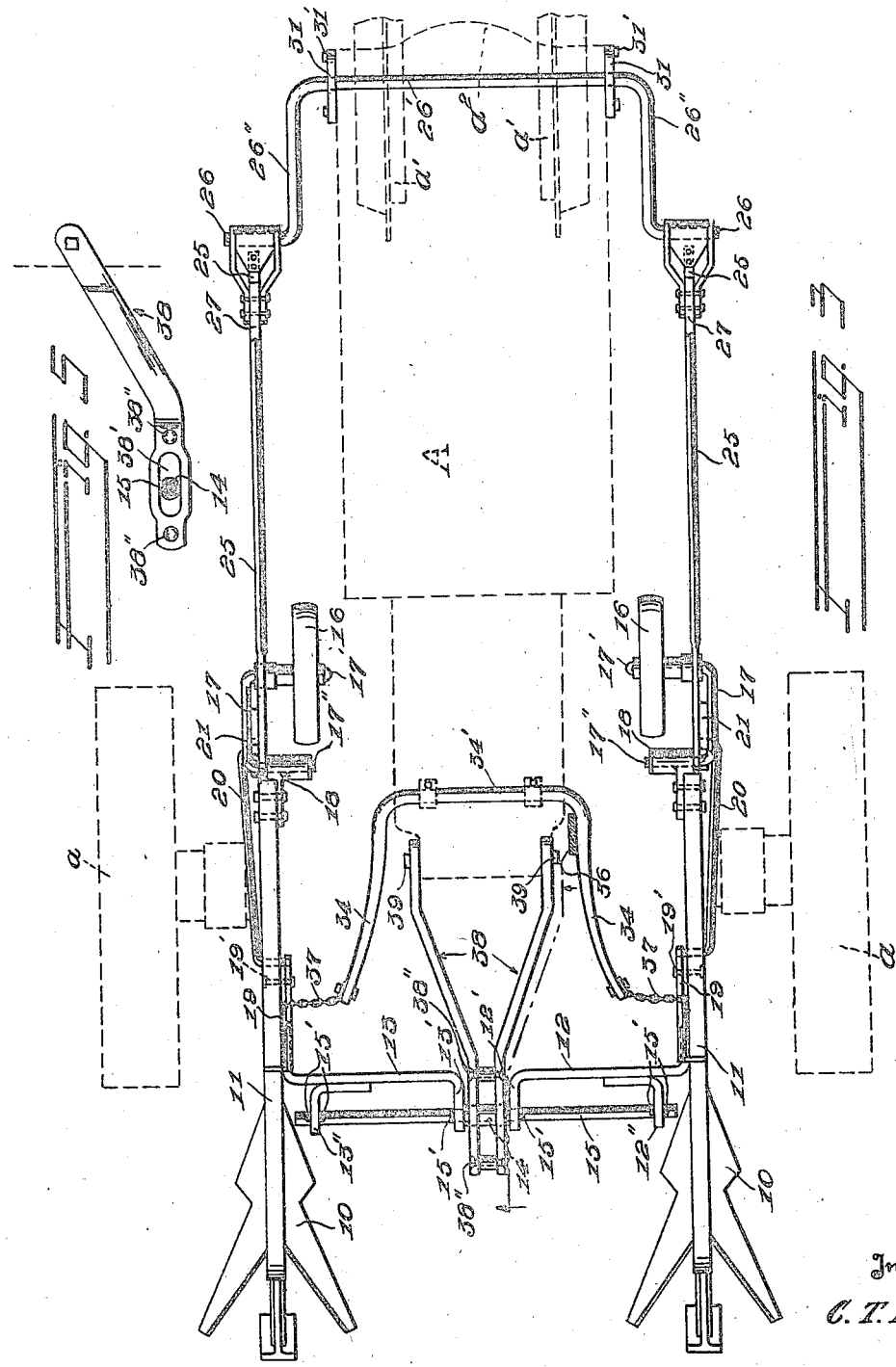

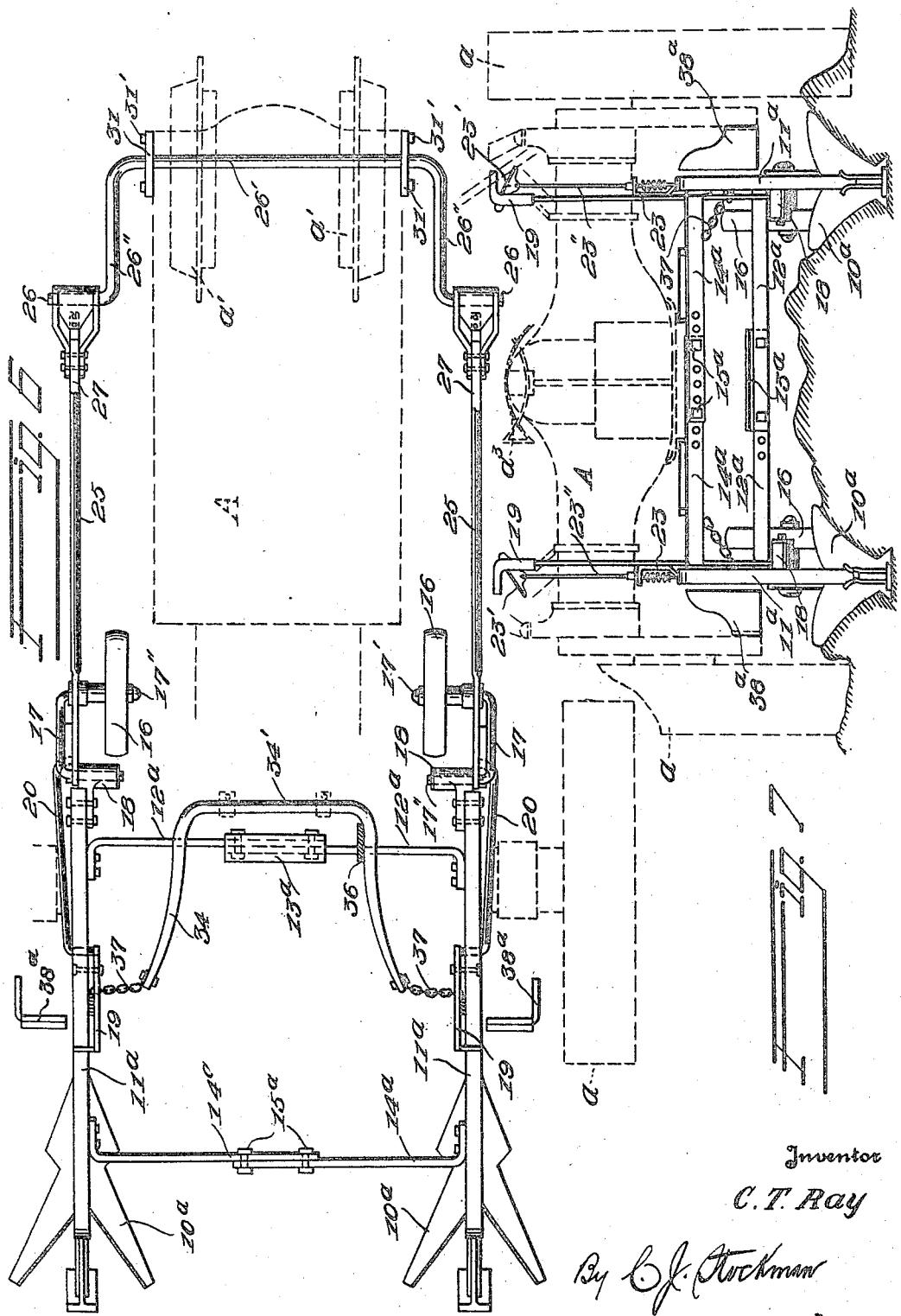

1,885,763

UNITED STATES PATENT OFFICE

CHARLES T. RAY, OF LOUISVILLE, KENTUCKY, ASSIGNOR TO B. F. AVERY & SONS, OF LOUISVILLE, KENTUCKY, A CORPORATION OF KENTUCKY

TILLAGE IMPLEMENT

Application filed December 29, 1930. Serial No. 505,416.

A primary purpose of this invention is to provide an attachment for tractors which, when assembled with the tractor, will form a tillage implement of very compact and of simple and durable nature including elements under control of the operator of the tractor for predetermining the depth at which the soil working members shall operate and other elements also under control of said operator for raising and lowering said members from and into working position by power derived from the travel of the tractor, and which implement will be capable of preparing the land for crops which are to be planted in rows, or of otherwise treating said land, in a satisfactory manner regardless of any unevenness in the land being worked or planted. Again, a primary purpose of this invention is to provide a tillage attachment for tractors, the respective earth-working elements of which will operate at the precise depth below the surface of the land for which they have been set, even though wheels of the tractor engage land which cause the tractor to move up or down, or to tilt sidewise, and even though any or all wheels of the tractor engage a soft spot or spots which cause lowering of the tractor frame and, unless corrected, will cause the earth working elements to penetrate deeper, thereby increasing the draft on the tractor to an extent which frequently renders it impossible for it to pull the load and hence makes it necessary for the operator to back the machine and readjust the earth working elements in order to pass over such spot or spots.

In a general way it may be stated that the invention in its complete form comprises a tractor of appropriate construction, which constitutes the power unit of the implement, and an attachment thereto which includes earth-working elements of appropriate nature, and also includes a supporting means for said elements having provision for the setting of the elements to work at various depths and also having provision for the maintenance of the selected depth, regardless of any inequality in the land engaged by said elements and regardless of any inequality of the land engaged by the wheels of the tractor.

In a general sense it may be stated that the attachment includes a particular correlation of parts, comprising a plurality of longitudinal beams which extend for a substantial distance beneath the body of the tractor and are respectively provided at their rear ends with appropriate earth working elements, as middle burster or lister plow bodies, for example, and at their front ends with depth adjusting means including land engaging members arranged to cooperate with a draft means of a particular nature in causing the earth working elements to work at the depth selected therefor under varying conditions of the land traversed by the wheels of the tractor as well as under varying conditions of the land traversed by said land engaging members at the front ends of the beams of the attachment, the said draft means being arranged to transmit draft from the tractor to the attachment but incapable of affecting the depth at which the earth working elements have been set to operate.

The invention also comprises a particular correlation of parts including an appropriate tractor—as one adapted for use in relation to two row crop operations, for example,— having a self-supported earth working attachment a considerable part of whose length is underneath the body of the tractor, and in which the parts are so constructed and combined that the attachment will be nonresponsive to sidewise tilting movements of the tractor while free to rise and fall relatively to the tractor in following the contour of the land being worked; in short, in which the earth working elements forming part of the attachment will always work at the depth to which they have been set, regardless of soft spots, humps or depressions encountered by any or all of the wheels of the tractor or like varying conditions encountered by the means which form a part of and support the attachment.

The invention comprises the novel combinations and correlations of elements illustrated in the accompanying drawings and described and claimed in the following specification.

The accompanying drawings exemplify attachments, or tillage units, which differ from each other in respect of their details, and yet contain the foregoing essential features, and I would have it understood that it is within the purview of the invention to embody the foregoing essential features in attachments or tillage units differing from each other in respects other than those illustrated in the accompanying drawings.

In said drawings:—

Fig. 1 is a side elevation of an implement including a tractor of approved construction and one preferred embodiment of the attachment, and shows the tractor outlined by dashes, and the attachment in working position by full lines and in transport by dot-and-dash outline;

Fig. 2 is a rear end elevation of the construction shown in Fig. 1 and shows the attachment in full lines and in working position, and also shows two different positions of the tractor relative to the attachment to thereby exemplify that in operation the tractor may assume different positions without affecting the position of the soil working elements, said different positions of the tractor being illustrated respectively in dash outline and in dot-and-dash outline;

Fig. 3 is a plan view showing principal portions of the tillage attachment in full lines and parts of the tractor in broken lines;

Fig. 4 is a detail view in side elevation of a part of the attachment shown also in Figs. 1–3, inclusive, and is intended particularly to illustrate the capability of relative up or down movements of the earth-working elements with their respective members embodied in this form of the invention;

Fig. 5 is a detail representation of one member of a guiding means such as that shown best in Fig. 3;

Fig. 6 is a view similar to Fig. 3, but illustrative of an embodiment which differs from the other in that it lacks capability of relative up and down movements of the earth-working elements, since the longitudinal members to which the earth-working elements are connected are rigidly tied together by transverse connecting elements; and Fig. 7 is a rear end elevation of the latter embodiment and shows also a different form of guiding means from that illustrated in Figs. 3 and 5.

The tractor, designated as a whole by the reference letter A, illustrated in relation to both embodiments of the invention is of a well known construction suitable for general farm usage including its use as the power unit of a tillage implement for preparing the land or for other work in relation to crops planted in rows. Since it is, or may be, of any suitable construction adapted to the uses mentioned, it is unnecessary to describe it in detail. It will be noted, however, that it is mounted upon two rear supporting wheels $a$ and two front supporting wheels $a^1$, and that its said front wheels are mounted at opposite sides of and near the transverse center of the front end $a^2$ of the tractor frame, while the rear supporting wheels are much more widely spaced from each other. The seat, designated $a^3$, is referred to since all of the controlling elements of the respective attachments hereinafter described, are arranged adjacent said seat so as to be readily accessible to the operator of the tractor.

A most useful application of the present invention is in relation to two row middle bursting or listing and planting requirements and accordingly the earth-working elements, which although alike in both embodiments are marked 10 in one embodiment and $10^a$ in the other, are respectively mounted on the downturned rear ends of longitudinaly extending beams, marked 11 in one embodiment and $11^a$ in the other. In both embodiments, these beams extend for a substantial distance underneath the body of the tractor, through the space between the rear tractor-supporting wheels $a$.

In the construction illustrated in Figs. 1–4, inclusive, the beams 10 are connected with each other, near their rear ends, by a means which is adapted to permit each beam to have up and down movement relatively to the other in following the conformation of the land, and at the same time will hold said beams against relative lateral movement. This means preferably comprises two arms 12 and 13 whose outer ends lie against and are rigidly secured to the respective beams and whose inner ends are respectively provided with flanges 12' and 13'. These flanges are arranged parallel with and spaced from each other, and each member 12 and 13 is also provided with other flanges 12" and 13" respectively near their outer ends. A spacing sleeve 14 is mounted between the flanges 12' and 13' and has its opposite ends in contact with the inner surfaces of said flanges. A shaft 15 extends through all of said flanges and through the spacing sleeve and is held against longitudinal movement by appropriate means, such as cotter pins indicated at 15'.

In the construction shown in Figs. 6 and 7, the beams marked $11^a$ are connected with each other by means which unites them into a unitary structure. The illustrated means includes a pair of members $12^a$ whose outer ends are secured to the respective beams near the front ends of the latter and whose inner ends overlap each other and are rigidly secured together by any suitable means, as the clip $14^a$ bolted thereto, for example. Said connecting means also includes a second pair of members 14', whose outer ends are secured to the respective beams and whose inner ends overlap each other, and are secured together by appropriate means, as the bolts 15ª, for example.

The front ends of the beams, 11, and also of the beams 11ª, are provided with land engaging elements and between said front ends and elements a pivotal relationship is provided, thus enabling the beams and the earth-working elements, 10, 10ª, carried by the beams to follow the conformation of the land traversed by said land engaging elements. These land engaging elements are respectively arranged in substantially the vertical planes of the corresponding earth-working elements 10 or 10ª and operate as gages and are adjustable. Hence they regulate the depth of penetration of the earth-working elements and maintain such depth regardless of any inequalities of the soil engaged by the earth-working elements. As here shown, the land engaging elements of the depth regulating means, in both embodiments of the invention, are wheels 16, 16 respectively mounted immediately in advance of the front ends of the beams 11 or 11ª upon spindles 17' extending inwardly from the corresponding ends of disconnected crank arms 17 whose opposite ends are similarly bent and form pivots 17" which are journalled in brackets 18, 18 rigidly fixed to the front ends of the respective beams 11, or 11ª. The adjusting members of the depth regulating means include manually operative levers 19, 19 respectively pivoted near their lower ends to the beams 11 or 11ª, as shown at 19', 19', and having their upper ends at opposite sides of and adjacent the seat $a^3$ of the tractor. The lower ends of these levers are connected with the respective crank arms 17, 17 by links 20, 20, said arms being preferably provided with fixed projections 21 to be engaged by the corresponding ends of the links. By means of said links and projections forward or rearward movement of the lower ends of the respective levers 19 are transmitted to said arms and hence to the wheels 16. It will thus be seen that the wheels 16 may be adjusted backward or forward, by corresponding adjustment of the levers 19, and that in their movement backward or forward they correspondingly raise or lower the beams 11 or 11ª and earth-working elements 10 or 10ª in accord with the depth at which said earth-working elements are intended to operate. Quadrants 22, whose teeth are selectively engageable with spring pressed latches 23 carried by the respective levers 19, fix said levers and hence the links and gage wheels 16 in their adjusted positions. The latches are released from the quadrants by thumb levers 23' connected with said latches by rods 23".

The front end portions of the beams, 11 or 11ª, are connected to the front end portion of the tractor by draft means of a nature such that it permits adjustment of the beams, earth-working elements and gage wheels as a unit from transport to working position and from working to transport position about a horizontal axis having a fixed relationship to the tractor, and which draft means does not interfere with, or otherwise affect, adjustment of said beams, earth-working elements and gage wheels in accordance with the depth which has been predetermined for the operation of the earth-working elements.

This draft means in both embodiments of the invention, includes links 25, 25 arranged at opposite sides of the tractor and each having pivotal connection at its rear end with the front ends of the corresponding beams, 11 or 11ª and extending thence at an inclination upward and forward to a place near the front end of the tractor and below the body of the latter. As here illustrated, the pivotal connection of these links with the front ends of the beams is brought about by mounting the rear ends of the links upon the respective spindle portions 17" of the crank arms of the gage wheels 16. The front ends of the respective links, in both illustrated embodiments of the invention, are journalled upon out-turned members 26 respectively extending from the ends of an arch-shaped element, which element includes a member 26', which extends across and is suitably secured to the front end of the tractor, and members 26", which connect its members 26 and 26' with each other at opposite sides of the element. At each side of the implement there is a thrust bar 27 which extends convergently with relation to the corresponding side arm 26" of the arch-shaped element and has its forward end mounted on the member 26 of said element. The rear end of each thrust bar is suitably connected to the frame of the tractor, being here shown as mounted in a socket 28 forming part of the tractor frame.

It will be understood that in adjusting the attachment or tillage unit in accordance with the selected depth of penetration of the earth-working elements 10, the forward ends of the beams respectively turn pivotally about the spindles 17" of the gage wheel arms and that the up and down movements of said beams in following the conformation of the land engaged by the gage wheels are also about the said spindles 17". These movements of the beams accordingly are relative to the links 25 and other elements of the draft mechanism. It will be noticed that the correlation of the links, arch element, and thrust bars, are such that the members 26 of the arch element are at all times held fixedly in position relatively to the body of the tractor and that in adjusting the soil working elements 10 or 10ª from transport to working position, and from working to transport position, the beams 11 or 11ª and the links 25, together with said soil working elements and the gage wheels, are moved unitarily about the members 26 of the arch element as the axis of such movement.

Adjustment of the height of the spindles 26, forming part of the arch member of the draft means, with relation to the land, thereby correspondingly adjusting the axis of the pivotal movement of the tillage attachment from and into working position, is contemplated and one means of simple and practicable construction by which this may be accomplished but to which the invention is not restricted has been illustrated. Said means includes a pair of brackets 30 secured to opposite sides of the tractor frame at the front end of the latter, and each having a plurality of recesses 30' in its upper surface. The transverse member 26' of the arch may be mounted in any one of these recesses thereby positioning the spindles 26 at a corresponding height from the land. Latches 31 pivoted respectively at 31' to the brackets 30, and extending over the upper surface of the latter, to which they are secured at 31", are provided to secure the arch in any of its adjusted positions, to said brackets.

The raising of the tillage attachment from working to transport position and the lowering of said attachment from transport to working position is accomplished by power derived from the travel of the tractor, through the medium of a power lift mechanism which includes a clutch B of appropriate construction and suitable connections between the driven member $b$ of said clutch and the frame of the implement. This clutch is of that well known construction operative by successive partial revolutions of its driven member respectively to raise and lower the part to be moved thereby. An example of such a clutch is shown in my patent of the United States issued November 9, 1926, and numbered 1,606,132, to which reference may be had. In the present invention its operation is initiated by the operator of the tractor through the medium of a foot actuated lever 32 pivoted at 33 to the frame of the tractor and having arm 33' by which it is connected to the driven member of the clutch. It will be noticed that the lever 32 is substantially of bell-crank form, and it will be understood that the driving member of the clutch is rotated continuously in the operation of the implement by any suitable connection with the tractor, and it will also be understood that said clutch, in common with all clutches of this nature, includes appropriate elements by which its driven and driving members are automatically engaged with each other under control of the lever 32 and automatically disengaged from each other when the movement initiated by operation of said lever has been completed. A lifting bail, including side arms 34, 34 connected with each other by a transverse member 34' suitably journalled to the frame of the tractor, is provided as a part of this power lift mechanism and said bail is connected with the driven member $b$ of the clutch by a link 35 which is pivoted at 35' to said driven member and at 35" to a member 36 which projects from the corresponding side arm 34 of the lifting bail. The free ends of said side arms are respectively connected with the beams 11 or 11ª by means of a lost motion nature adapted to permit relative movement between said beams and arms, as in adjusting the parts in accord with selected depths of penetration of the soil working members and in enabling the beams and earth working members to rise and fall relatively to the tractor and with the gage wheels 16, when the latter encounter depressions or soft spots as well as humps, and, in short, to adapt the earth working elements to follow the conformation of the particular parts of the land respectively engaged by the gage wheels. Flexible means, such as chains 37 whose lengths are such as to provide slack sufficient to permit such relative movements, are preferred.

It will be apparent that in the operation of the power mechanism the lifting bail will be turned about the axis of its member 34' and, assuming such movement to be a lifting movement, the first part thereof will take up the slack in the chains whereupon the bail will become effective to raise the beams 11 or 11ª and the earth-working elements 10 or 10ª, gage wheels 16, and rear ends of the links 25, to transport position: and it will be understood that when this operation has been completed the driven member of the clutch is automatically disconnected from the driving member thereof and that the parts which have just been raised to transport position will be held in said position by the connection between the lifting bail and said driven member, since the construction of clutches of this nature is such that the driven member is held in a fixed position until the control lever, the lever 32 in this instance, has been again operated. When said lever has been so again operated the reverse movement obviously takes place.

To guide the beams of the tillage attachment in their up and down movements and hold them against undue lateral movement two different means of guiding nature with relation to the beams are illustrated in the accompanying drawings. While one of these means is shown only in operative relation with the embodiment of the invention in which the beams are movable relatively to each other (see Figs. 3 and 5) and the other only in relation to that embodiment in which the beams are fixed together against relative movement (see Figs. 6 and 7) I would have it understood that either form of guiding means may be used in either of said embodiments of the invention. In fact, a guiding means of any suitable construction and attached to any suitable part or parts of the complete assemblage, may be employed, provided such means will act to confine the tillage attachment to a predetermined limited lateral movement relative to the body of the tractor and will permit the necessary relative up and down movements of the tillage attachment and tractor.

The particular guiding means shown best in Figs. 3 and 5 comprehends a pair of arms 38 whose rear ends are slotted, as shown at 38', and held in a spaced relation by rivets 38''. The forward ends of these arms extend forwardly and upwardly in a divergent relationship with each other and are each pivoted to the tractor, at 39. The rear ends of these arms are arranged between the flanges 12', 13' of the arms 12 and 13, through the medium of which the beams 11 are pivoted upon the shaft 15, and are mounted on the spacing sleeve 14 which extends through the slots 38', as shown in Fig. 5.

The other form of the guiding means, shown in Figs. 6 and 7, comprises two separate arms 38$^a$ wholly detached from each other and respectively fixedly secured at their outer ends to an appropriate part of the tractor from which they project downward into position at the outer sides of the beams.

It will be apparent that with either of these forms relative up and down movements of the tractor and beams of the tillage attachment is permitted and at the same time lateral swinging movements of said beams is prevented.

It is preferred in practice to so correlate the parts that convenient interchange of tillage attachments may be effected and, in this connection, attention is called to the fact that the forward ends of the draft links 25 and thrust bars 27 are held upon the arch spindles 26 by cotter pins 26'', the removal of which pins permits the draft links and thrust bars to be detached from the arch. The thrust bars may then be reconnected to said spindles and will be held against displacement therefrom by replacing the cotter pins. When the draft links have been thus disconnected from the arch, and when the chains 35 have been disconnected from the beams 11 or from the arms 34 of the bail, the beams, gage wheels, and soil working elements are thereby freed from any connection with the tractor.

From the foregoing, it will be noticed that I have provided an implement in which the correlation of parts is such that the depth regulating levers and power lift control lever are adjacent the driver's seat so that he may conveniently operate the same by direct pressure thereby, and that none of the weight of the tractor is imposed upon the attachment, and, moreover, that the connections between the tractor and attachment are such as to permit the front end of the tractor to follow inequalities in the soil, that is to roll over a hump or into a hollow, and the rear side wheels of the tractor similarly to follow inequalities in the soil, such as may be caused by a hump at one side or a hollow on the other, or by a soft spot in the land, resulting in a sidewise tilting of the frame, without substantially affecting the horizontal position of the attachment beams and accordingly without substantially affecting the operation of the earth-working elements predetermined by the setting thereof; in other words, without correspondingly lessening or deepening the furrows formed by the plow bodies and without causing either to produce a furrow of different depth from that produced by the other in the same movement of the tractor. See in this connection, Fig. 2, the said figure showing in full lines the relative position of the rear ends of the tractor frame and attachment in plowing a normally level ground, and, in broken outline, the relative position of said parts when one side of the tractor body is at a level much lower than that of the other side, due to the fact that the wheel at the former side is in a hollow and to the fact that the wheel at the other side is riding a hump. This of course would be an extreme position, yet it will be noticed that the horizontal position of the attachment with relation to the ground has not been disturbed and accordingly that the plow bodies will still produce furrows of even depths with relation to each other and which depth will be that predetermined by the setting of the depth regulating means.

This very advantageous result is accomplished in this invention, notwithstanding the longitudinal beams of the attachment occupy a position substantially under the body of the tractor, for the reason that the positions of the tillage elements relatively to the tractor in the actual tilling operation are wholly controlled by the particular parts of the land engaged by the gage wheels and are not affected by any movement of any of the tractor wheels through a depression or over a hump, or when they encounter a soft spot, in the land. For example, the tractor may move up or down, or may tilt sidewise in conformity with the character of the land engaged by its wheels while at the same time the front ends of the beams of the attachment may move automatically up or down in a direction opposite the tractor, or remain in a level position, in conformity with the parts of the land engaged by the gage wheels: and this highly desirable full flexibility between the tractor and the "attachment", herein so called, results in the preparation of a seed bed of the same depth throughout, and in even cultivation of the crops, regardless of depressions, humps and soft spots in the land, and this most important result is believed to be new in all row crop and analogous operations in which soil working means are arranged substantially underneath the bodies of tractors appropriate for such operations.

Finally it will be noticed that the foregoing results are secured in a construction of very compact nature and one in which all the controls are immediately adjacent the tractor seat.

Having thus described the invention, what I believe to be new and desire to secure by Letters Patent, is:—

1. A tillage attachment for a wheeled tractor, including a beam to extend beneath the body of the tractor, a tillage element carried by said beam, a depth regulating means, including an adjustable land engaging gage member connected to the front end of the beam in substantially the vertical plane of the tillage element to cause the beam and the tillage element to follow the conformation of the land engaged by said gage member and also including an adjusting lever positioned to be immediately adjacent the seat of the tractor, and a flexible draft means extending from the front end of the longitudinal member and arranged to be underneath the tractor body and adapted to be connected to the front end portion of said body.

2. A tillage attachment for a wheeled tractor, including a longitudinal member to extend beneath the body of the tractor, a tillage element carried by said member, a depth regulating means including an adjustable land engaging member having connection with the front end of the longitudinal member and acting as a gage, an operative-controlled power lift mechanism having a lost motion connection with said longitudinal member and including a clutch operative by successive partial revolutions to raise and lower the longitudinal member and the tillage element and gage from and into working position, a draft member having at one end a horizontal connection with the front end of the longitudinal member and about which connection said end of the member moves in the adjustment for depth, and said draft member also having, at its opposite end, a horizontal pivotal connection about which the parts move from and into ground working position, means for fixing the latter connection to the tractor near the front end of the latter, and an operating lever arranged to be adjacent the seat of the tractor for initiating movements of the power lift mechanism.

3. A tillage attachment for a wheeled tractor, including a longitudinal member to extend beneath the body of the tractor, a tillage element carried by said member, means connected to said member to raise and lower the tillage element from and into working position and to variably regulate the depth at which said element shall work, a draft link whose rear end has pivotal connection with the front end of the longitudinal member, and means to which the forward end of the draft link has pivotal connection and by which said link is to be attached to the tractor, said means including members whose lower ends diverge from said connection and whose upper ends are adapted for connection with the tractor at widely spaced places in the length of the latter.

4. A tillage attachment for a wheeled tractor, including a longitudinal beam to extend well beneath the body of the tractor, a tillage element carried by the rear end of said beam, means including a land engaging gage member connected to the front end of the beam and arranged in substantially the vertical plane of the tillage element and operative to cause said beam and tillage element to follow the conformation of the land engaged by the tillage element, a flexible draft means to connect the front end of the beam with the front end portion of the tractor, and a guiding means arranged to permit up and down movements of the beam relatively to the tractor, in conformity with inequalities in the land engaged by the supporting means of said beam and to confine the latter against lateral movement within predetermined limits.

5. A tillage attachment for a wheeled tractor, including a longitudinal member to extend beneath the body of the tractor, a tillage element carried by said member, a land engaging member which supports the front end of the longitudinal member and acts as a gage, and a flexible draft means to connect the front end of said longitudinal member with the tractor, including a link which extends in an upwardly inclined direction from said member and whose rear end has horizontal pivotal connection with the latter, and also including a member extending in an upward and forward direction from the forward end of the link and whose forward end is adapted for attachment to the tractor and whose rear end has a horizontal pivotal connection with the said forward end of the link, and a forwardly and downwardly extending thrust bar whose rear end is adapted for connection to the tractor and whose forward end is in such relation with the pivotal connection at the front end of the link and with the member which connects the link with the frame as to co-operate with said member in holding said pivotal connection fixedly in place.

6. A tillage attachment for a wheeled tractor, including a longitudinal member to extend beneath the body of the tractor, a tillage element carried by said member, a land engaging wheel which acts as a gage, a crank arm having a spindle at its lower end upon which said wheel is mounted and provided at its upper end with a laterally extending member journalled to said longitudinal member, an adjusting lever for said gage wheel positioned to be immediately adjacent the seat of the tractor and a draft link whose rear end is mounted on the laterally extending member of the crank arm, said link being arranged to be underneath the tractor body and adapted to be connected to the front end portion of the latter.

7. A structure according to claim 2, in which the depth regulating means also includes an operating lever positioned to be adjacent the tractor seat when the attachment and tractor are in their assembled relation.

8. A tillage attachment for a wheeled tractor, comprising a plurality of longitudinal members each to extend beneath the body of the tractor, tillage elements respectively carried by said members, depth regulating means provided with adjustable land engaging members having connection with the front ends of the respective longitudinal members and acting as gages, an operatively controlled power lift device to be carried by the tractor, a bail, including a transverse member to be journalled to the body of the tractor and side arms carried by said member, connections between the bail and the power lift device and lost motion means respectively attached to the side arms of the bail and connecting the same with the respective longitudinal members.

9. A structure according to claim 3, wherein means are provided to permit ready connection and disconnection of the front end of the link from and into operative relationship with the means by which it is connected to the tractor.

10. A tillage attachment for a wheeled tractor, including a longitudinal beam to extend well beneath the body of the tractor, a tillage element carried by the rear end of said beam, a gage member pivotally connected to the front end of the beam and arranged in substantially the vertical plane of the tillage element and operative to cause said beam and tillage element to follow the conformation of the land engaged by the tillage element, means, including a lever positioned to be adjacent the tractor seat when the attachment is assembled with the tractor, to adjust the gage member and thereby regulate the depth of penetration of the tillage element into the land and a flexible draft means to connect the front end of the beam with the front end portion of the tractor.

11. A tillage attachment for a wheeled tractor, including a longitudinal member to extend beneath the body of the tractor, a tillage element carried by said member, a crank arm having at its upper end a laterally extending member journalled to the front end of said longitudinal member and provided at its end with a spindle, a land engaging gage wheel mounted upon said spindle and operating to cause the longitudinal member and tillage element to follow the conformation of the land engaged by the tillage element, a flexible draft means to connect the front end of the longitudinal member with the front end portion of the tractor, including a link whose rear end is mounted on the laterally extending member of the crank arm, and a guiding means arranged to permit up and down movements of the longitudinal member relatively to the tractor and to confine said member against lateral movement within predetermined limits.

12. A tillage attachment for a wheeled tractor, including a pair of beams, means connecting said beams with each other to hold them against relative lateral displacement, tillage elements connected to the rear ends of said beams, depth regulating means, including land engaging gage elements connected directly to the front ends of the respective beams, and a draft means, including forwardly extending independent draft links whose rear ends have horizontal pivotal connection with the front ends of the beams and whose forward ends are adapted for horizontal pivotal connection with a means by which the draft means is connected to the tractor.

13. A tillage attachment for a wheeled tractor, including a pair of beams, means connecting said beams with each other to hold them against relative lateral displacement, tillage elements connected to the rear ends of said beams, crank arms provided at their upper ends with laterally extending members journalled at the front ends of the respective beams, land engaging gage wheels mounted on the lower ends of said crank arms, and draft means including forwardly extending draft links whose rear ends are journalled upon the laterally extending members of the crank arms and whose forward ends are adapted for horizontal pivotal connection with a means by which the draft means is connected to the tractor.

14. A structure according to claim 12, in which the means to connect the draft links with the tractor includes a forwardly and rearwardly adjustable arch having lateral spindles upon which the forward ends of the draft links are mounted.

15. A structure according to claim 12, in which the means to connect the forward ends of the links with the tractor includes, for the respective links, a pair of downwardly converging members which have connection with each other at their lower ends and are adapted for connection with the tractor at their upper ends, and co-operatively hold the pivotal connection at the front ends of the corresponding link against displacement relatively to the tractor.

16. A structure according to claim 12, in which the means to connect the draft links with the tractor includes an arch having spindles at its ends upon which the forward ends of the draft links are journaled, and in which, also, thrust bars, adapted for connection with the tractor, are connected with the arch in such relation thereto as to prevent displacement of said spindles relative to the tractor.

17. A structure according to claim 12, in which the means to connect the draft links with the tractor includes an arch whose side arms extend forward and upward from the links and have spindles at their free ends upon which the links are journaled and whose transverse member is attached to the tractor when the the tractor and attachment are assembled, and in which thrust bars are employed, respectively adapted for connection at one end to the tractor and extending thence in a forward and downward direction and having their other ends connected to the arch in such relation thereto as to co-operate therewith in holding said spindles against displacement.

18. A tillage attachment for a wheeled tractor, including a pair of beams having relative up and down movements and held against relative lateral displacement, tillage elements carried by the rear ends of said beams, land engaging gage wheels respectively connected to the front ends of the beams and a draft means, including forwardly extending independent draft links whose rear ends have horizontal pivotal connection with the front ends of the beams and whose forward ends are adapted for horizontal pivotal connection with a means by which the draft means is connected to the tractor.

19. A structure according to claim 12, in which the means connecting the beams with each other unites the beams into a unitarily movable structure.

20. A tillage attachment for a wheeled tractor, including a pair of beams, means connecting said beams with each other to hold them against relative lateral displacement, tillage elements connected to the rear ends of said beams, depth regulating means including land engaging gage elements connected directly to the front ends of the respective beams, a draft means including forwardly extending draft links whose rear ends have horizontal pivotal connection with the beams and whose forward ends are adapted for horizontal pivotal connection with a means by which the draft means is connected to the tractor, and a guiding means to be connected to the tractor to define lateral movement of either beam relatively to the tractor.

21. A tillage attachment for a wheeled tractor, including a pair of beams, tillage elements connected to the rear ends of the beams, land engaging supporting means for the front ends of the beams, draft means to connect the beams with the tractor, and means connecting the beams with each other and permitting relative up and down movements thereof in accord with the conformation of the land traversed by the respective supporting means, said connecting means including members whose outer ends are attached to the respective beams and a transversely extending shaft with which said members have pivotal connection.

22. A tillage attachment for a wheeled tractor, including a pair of beams, tillage elements connected to the rear ends of the beams, land engaging supporting means for the front ends of the beams, draft means to connect the beams with the tractor, and means connecting the beams with each other and permitting relative up and down movements thereof in accord with the conformation of the land traversed by the respective supporting means, said connecting means including members whose outer ends are attached to the respective beams and whose inner ends are provided with rearwardly extending flanges spaced from each other, other rearwardly extending flanges secured to the respective members near the outer ends of the latter, a spacing sleeve between the flanges at the inner ends of the members, a shaft extending through the spacing sleeve and also through all of said flanges and about which said members have pivotal movement, and means operatively related to said flanges and shaft to prevent lateral displacement of the beams relatively to each other.

23. A structure according to claim 21 in which a guide means, mounted at the rear end upon said shaft and adapted for pivotal connection at the front end with the tractor, is provided to define lateral movements of the beams relatively to the tractor.

24. A structure according to claim 22 in which guide arms mounted at their rear ends on the spacing sleeve and extending forwardly therefrom and having their forward ends adapted for pivotal attachment to the tractor, are provided to define lateral movements of the beams relatively to the tractor.

25. A tillage attachment for a wheeled tractor including a pair of beams, means to pivotally connect the beams with the tractor and means pivotally connecting said beams with each other, said means co-operating to hold the beams against relative lateral movement and to permit their front ends to move up and down relative to each other and to the tractor.

26. A tillage attachment for a wheeled tractor, comprising a pair of beams, means pivotally connecting said beams with each other to permit them to have relative up and down movements while holding them against relative lateral movement, a power lift mechanism, including a clutch and connections between the beams and said clutch, operative to lift the beams bodily to transport position and to permit limited up and down movement of the beams relative to the tractor while in working position.

27. A tillage attachment for a wheeled tractor, comprising a pair of beams, means pivotally connecting said beams with each other, a lifting bail having a horizontal member adapted to be journalled to the frame of the tractor and side arms whose free ends respectively have connection with the beams permitting limited vertical movement of the beams relatively to said ends, respectively, while the parts are in a working position, a power lift mechanism including a clutch one member of which is connected to the bail and operates therethrough to raise and lower the beams from and into working position.

28. A tillage attachment for a wheeled tractor, including a pair of beams, means pivotally connecting said beams with each other to hold them against relative lateral movement and permit their front ends to have relative movements automatically in up and down directions during actual soil working operation, tillage elements connected to said beams, depth regulating means, including land engaging gauge elements for the respective beams and means for adjusting the gauge elements vertically relative to the beams, respectively, and draft means, including draft links whose rear ends have horizontal pivotal connections with said beams and whose forward ends are adapted for horizontal pivotal connection with the tractor frame near the forward end of the latter.

29. A one man tillage implement for use in relation to row crops, comprising a tractor including a frame and supporting wheels at its front and rear ends, a plurality of beams whose rear ends are provided with tillage elements and whose forward ends extend beneath the frame of the tractor and between the rear wheels thereof, depth regulating means having land engaging gauge means connected to the front end of the beams and arranged in substantially the vertical planes of the tillage elements, a draft mechanism, having a horizontal pivotal connection at its rear end with the front end of the beams and its front end attached to the front end portion of the tractor frame, and also having a horizontal pivot fixed against movement relatively to the tractor, and an operator-controlled power lift means including power transmitting connections to the carrying means of the tillage elements.

30. A structure according to claim 29, in which the power transmitting connections of the power lift mechanism include a bail journaled upon the tractor frame and flexible connections between the ends of the bail and the means, permitting limited up and down movements of the latter means automatically under control of the gauge means in conformity with the conformation of the land traversed by said gauge means.

31. A one man tillage implement for use in relation to row crops, comprising a tractor including a frame and supporting wheels at its front and rear ends, tillage elements, means carrying said tillage elements and extending beneath the frame of the tractor, depth regulating means having land engaging gauge means connected to the front end of the means which carry the tillage elements, a draft mechanism, having a horizontal pivotal connection at its rear end with the front end of the means which carry the tillage elements and its front end attached to the front end portion of the tractor frame, and also having a horizontal pivot fixed against movement relatively to the tractor, and a power lift means including a clutch and power transmitting connections between the clutch and the means which carries the tillage elements, co-operative by successive partial revolutions of the clutch to raise and lower said means, said power transmitting connections including a bail journaled to the tractor frame, a link between the bail and the clutch, and flexible connections between the free ends of the bail and the means which carries the tillage elements.

32. A tillage implement comprising a tractor having supporting wheels at its front and rear ends, a plurality of beams arranged beneath the body of the tractor and provided at their rear ends with tillage elements and at their front ends with land engaging supporting means, said tillage elements, land engaging supporting means and tractor wheels being relatively arranged to adapt the implement for row crop operation, and connecting and guiding means between the beams and the tractor body arranged to permit the tractor to tilt laterally or longitudinally without imparting similar movement to the beams to move freely in up and down directions relatively to the tractor in accordance with inequalities in the land engaged by the land engaging supporting means and to restrain said beams against sidewise swaying movement.

33. A tillage implement comprising a wheeled tractor adapted to row crop operations, a plurality of beams arranged underneath the tractor body and respectively provided at their rear ends with tillage elements, separate land engaging gage wheels supporting the front ends of the respective beams, means for adjusting said gage wheels to variably regulate the depth of penetration of the tillage elements into the soil, and draft elements connecting the front ends of the respective beams with the tractor body and permitting sidewise tilting movement of said body relatively to the beams and also permitting the beams freely to rise and fall relatively to the tractor: whereby the tillage elements are caused to work at the depth for which they have been set, regardless of any inequalities in the particular parts of the land traversed by the tractor wheels and regardless of any inequalities in the particular parts of the land traversed by the gage wheels.

34. A tillage implement comprising a wheeled tractor adapted to row crop operations, a plurality of beams arranged underneath the tractor body and respectively provided at their rear ends with tillage elements, separate land engaging gage wheels supporting the front ends of the respective beams and mounted in substantially the vertical planes of the respective tillage elements, and draft elements connecting the front ends of the respective beams with the tractor body and permitting sidewise tilting movement of the body in conformity with inequalities in the particular parts of the soil engaged by the tractor wheels without imparting corresponding movement to the beams, and also permitting the beams freely to rise and fall relatively to the tractor in conformity with inequalities in the particular parts of the soil engaged by the gage wheels.

35. A tillage implement comprising a wheeled tractor adapted to row crop operation, a plurality of beams arranged underneath the tractor body and respectively provided at their rear ends with tillage elements, separate land engaging gage wheels supporting the front ends of the respective beams, a plurality of disconnected draft links whose rear ends have horizontal pivotal connection with the front ends of the respective beams and about which connection the beams and gage wheels have up and down movements in accord with the conformation of the soil engaged by said gage wheels, and whose front ends have horizontal pivotal connection with the front end portion of the tractor, and means deriving power from the travel of the implement for raising and lowering said beams and links unitarily to full transport position about the pivots at the front ends of the links.

36. A tillage implement comprising a wheeled tractor adapted to row crop operations, a plurality of beams arranged underneath the tractor body and respectively provided at their rear ends with tillage elements, land engaging means supporting the front ends of the beams, draft means having forward pivotal connection with the body and rearward pivotal connection with said beams, said connections being on horizontal axes, adjusting means for raising and lowering the forward ends of the beams about said rearward pivotal connections, and means for raising and lowering the beams and draft means unitarily about said forward pivotal connections, the latter means comprising a bail pivoted to the body of the tractor, lost motion connections between the ends of the bail and the respective beams, a clutch carried by the tractor and including a driving and driven member, the driving member being operated by power derived from the travel of the implement, means under control of the operator for moving the driven member into operative engagement with the driving member, and connections between said driven member and the bail.

37. A tillage implement according to claim 20 in which the beams are mounted to be independently movable in up and down directions relatively to each other and to the means which connect the beams with the tractor, in conformity with the conformation in the soil engaged by the land engaging supporting means for the front ends of the beams.

38. A tillage implement according to claim 20 in which the beams are mounted to be independently movable relatively to each other in up and down directions, the land engaging means which support the front ends of the beams are separate gage wheels movable independently of each other, and the connecting and guiding means include a plurality of independent links whose rear ends are pivotally connected to the respective beams and whose forward ends have pivotal connection with the tractor body.

39. A tillage implement comprising a tractor having supporting wheels at its front and rear ends, a plurality of beams arranged beneath the body of the tractor and provided at their rear ends with tillage elements and at their front ends with land engaging gage wheels, said tillage elements, land engaging gage wheels and tractor wheels being relatively arranged to adapt the implement for row crop operation, a plurality of independent draft links respectively connecting the front ends of the beams with the tractor body and means to permit the beams to have relative up and down movements in accord with the conformation of the soil engaged by the respective gage wheels while holding them against relative lateral movement, including members respectively secured at their outer ends to the beams, a shaft carried by said arms, and arms having slotted rear ends through which said shaft extends and having their front ends pivoted to the tractor.

40. A tillage implement according to claim 39 in which the land engaging gage wheels are arranged substantially in the vertical planes of the tillage elements, respectively and are independently adjusted under control of the operator to variably regulate the depth of penetration of said tillage elements into the soil, and means under control of the operator are provided to raise and lower said beams and draft links unitarily, from and into soil tilling positions, said means including a bail pivotally connected to the tractor and whose side arms have lost motion connection with the respective beams.

In testimony whereof I affix my signature.

CHARLES T. RAY.